(12) United States Patent
Harris et al.

(10) Patent No.: US 8,470,247 B2
(45) Date of Patent: Jun. 25, 2013

(54) SURFACES RESISTANT TO NON-SPECIFIC PROTEIN ADSORPTION AND METHODS OF PRODUCING THE SAME

(75) Inventors: Joel M. Harris, Salt Lake City, UT (US); Henry S. White, Salt Lake City, UT (US); Joshua R. Wayment, Salt Lake City, UT (US); Ryan J. White, Santa Barbara, CA (US)

(73) Assignee: University of Utah Research Foundation, Salt Lake City, UT (US)

( * ) Notice: Subject to any disclaimer, the term of this patent is extended or adjusted under 35 U.S.C. 154(b) by 244 days.

(21) Appl. No.: 12/254,740

(22) Filed: Oct. 20, 2008

(65) Prior Publication Data

US 2009/0175765 A1    Jul. 9, 2009

Related U.S. Application Data

(60) Provisional application No. 60/981,422, filed on Oct. 19, 2007.

(51) Int. Cl.
 *G01N 15/06* (2006.01)
(52) U.S. Cl.
 USPC ........................................................ 422/68.1
(58) Field of Classification Search
 USPC ........................................................ 422/68.1
 See application file for complete search history.

(56) References Cited

U.S. PATENT DOCUMENTS

| | | | | |
|---|---|---|---|---|
| 5,405,766 | A | * | 4/1995 | Kallury et al. ................ 435/174 |
| 5,466,732 | A | * | 11/1995 | Tomioka et al. .............. 524/113 |
| 2001/0055754 | A1 | * | 12/2001 | McGrath et al. .................. 435/5 |
| 2004/0023413 | A1 | * | 2/2004 | Opalsky ........................ 436/518 |
| 2004/0259094 | A1 | | 12/2004 | Odedra et al. | |

OTHER PUBLICATIONS

Uchida et al., Dipole Moments and the Structures of Polyethylene Glycols, 1956, Journal of Polymer Science, vol. XXI, pp. 313-322.*
Wayment et al., Controlling Binding Site Densities on Glass Surfaces. Analytical Chemistry, vol. 78, No. 22, Nov. 15, 2006. pp. 7841-7849.

* cited by examiner

*Primary Examiner* — Lore Jarrett
(74) *Attorney, Agent, or Firm* — Thorpe North & Western LLP

(57) ABSTRACT

A method of preventing non-specific adsorption of proteins onto a surface can include providing a substrate that has a surface on which surface groups are attached. A solution can be applied to the surface that includes a protective reagent having a terminal functional group exhibiting a dipole moment. A monolayer comprising the protective reagent is assembled on the surface by reacting the protective reagent with the surface groups, thereby creating a protected surface. The protective reagent alone is sufficient to confer to the protected surface an increased resistance to adsorption of proteins.

26 Claims, 4 Drawing Sheets

SURFACES RESISTANT TO NON-SPECIFIC PROTEIN ADSORPTION AND METHODS OF PRODUCING THE SAME

RELATED APPLICATIONS

This application claims the benefit of U.S. Provisional Patent Application No. 60/981,422, filed Oct. 19, 2007, which is incorporated herein by reference.

GOVERNMENT INTEREST

This invention was made with government support under Grant #CHE0137569 awarded by the National Science Foundation. The Government has certain rights to this invention.

BACKGROUND OF THE INVENTION

Control of the density of surface-immobilized ligands or surface-binding sites is an important issue for the manipulation of surface properties and the development of sensors, array- or chip-based assays, and single-molecule detection methods. The density and chemical identity of surface-immobilized ligands can be used to control the wettability of surfaces, the selective adsorption of biological molecules, and the attachment and growth of cells on artificial surfaces. The signal level and response sensitivity that one observes from waveguide, interfacial fluorescence, or SPR-based sensors depends directly on controlling the density of reactive binding sites on the surface. For cooperative or multivalent binding of biological molecules to surface-tethered ligands, the density of ligands on the surface can significantly influence binding equilibria and energetics.

The control of ligand density on surfaces has been addressed in a number of ways. To produce gradients in ligand density on surfaces, one can generate a diffusion gradient of silane reagent in solution so that the target glass surface is exposed to a varying concentration of reagent, leading to a gradient in the density of bound silane ligands. This same approach can be implemented for generating gradients of organothiol ligands on metal surfaces. One clever method of producing a similar ligand density gradient on thin gold films involved the reductive desorption of thiol-bound ligands by applying an in-plane potential gradient across the film. Control of surface ligand densities and the preparation of density gradients can also be achieved by contact printing techniques by varying the concentration of ligand on the stamp or the contact time between the stamp and the surface. When characterizing the reactivity of isolated ligands on surfaces at the single-molecule level, it is important that the ligand spacing on the surface be controlled so that the response can be controlled. Widely spaced ligands correspond to very small ($<10^{-6}$) fractions of a full monolayer and are challenging to generate in a controlled manner using the conventional or known techniques. Therefore, none of the existing techniques provides controllable and predictable placement of ligands at very low densities.

SUMMARY OF THE INVENTION

It has been recognized by the inventors that with low surface concentrations of immobilized ligands, it is important that non-specific binding to the vast unlabeled areas of the surface be minimized. Therefore, the present invention provides a platform for microscale analysis in which non-specific adsorption of proteins is reduced. A method of preventing non-specific adsorption of proteins onto a surface can include providing a substrate that has a surface on which surface groups are attached. A solution can be applied to the surface where the solution includes a protective reagent having a terminal functional group exhibiting a dipole moment. A monolayer including the protective reagent can be assembled on the surface by reacting the protective reagent with the surface groups, thereby creating a protected surface. The protective reagent alone is sufficient to confer to the protected surface an increased resistance to adsorption of proteins. The terminal functional group of the protective reagent may be a nitrile group, or in a specific embodiment, a cyano group, although other groups can also be suitable.

The method of the present invention confers resistance to nonspecific protein adsorption, so that a protein applied to the protected surface binds to less than about $1 \times 10^{-6}$ of the total area of the protected surface. In a specific embodiment, the protective reagent can be used as a dilution carrier for a protein-binding reagent.

The present invention also provides a microanalysis platform which includes a substrate having a surface to which surface groups are attached. The platform can also include a monolayer comprising a protective reagent covering an area of the surface, so that the area covered is a protected surface. The protective reagent is bound to the surface groups and the protective reagent can also have a terminal functional group exhibiting a dipole moment. The protective reagent alone is sufficient to confer to the protected surface an increased resistance to adsorption of proteins. The microanalysis platform can optionally further comprise a protein-binding reagent at small fractions and being relatively uniformly dispersed across the protected surface.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention and they are, therefore, not to be considered limiting of its scope. It will be readily appreciated that the components of the present invention, as generally described and illustrated in the figures herein, could be arranged, sized, and designed in a wide variety of different configurations. Nonetheless, the invention will be described and explained with additional specificity and detail through the use of the accompanying drawings in which:

FIG. 2A illustrates immobilization of tetramethylrhodamine succinimidyl ester to aminopropylsilane sites on the glass surface while FIG. 2B illustrates immobilization of 6-(6-((biotinoyl)bis(aminohexanoyl))succinimidyl ester to aminopropylsilane sites on the glass surface according to one embodiment of the present invention.

DETAILED DESCRIPTION OF EXEMPLARY EMBODIMENTS

Figure 1:
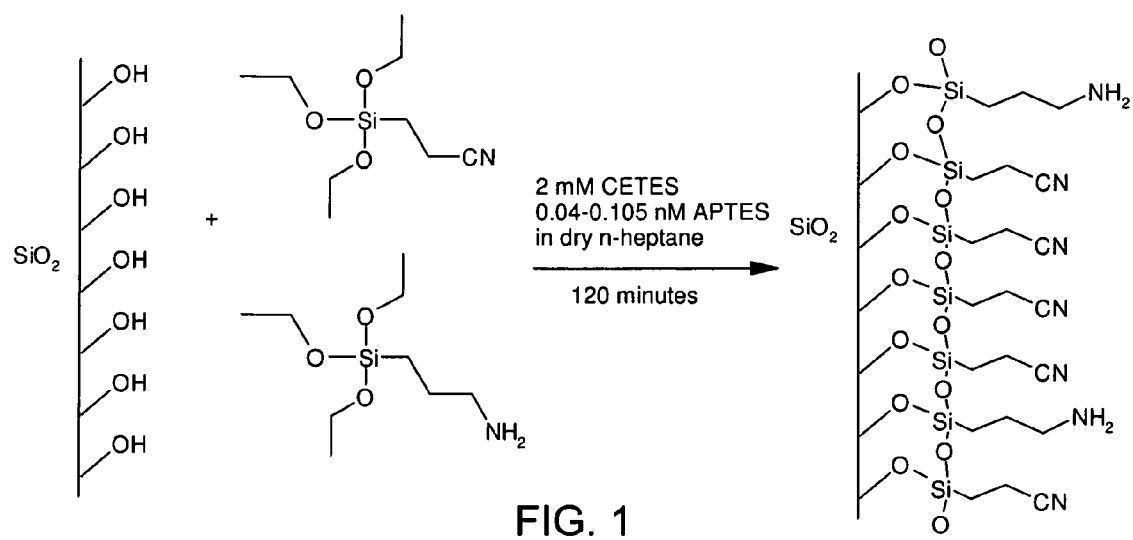
FIG. 1 is a reaction mechanism on a glass surface illustrating immobilization and cross-linking of dilute aminopropylsilane groups in a cyanoethylsilane self-assembled monolayer in accordance with one embodiment of the present invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Definitions

In describing and claiming the present invention, the following terminology will be used.

The singular forms "a," "an," and "the" include plural referents unless the context clearly dictates otherwise. Thus, for example, reference to "a ligand" includes reference to one or more of such materials and reference to "reacting" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, the term "protected surface" refers to a surface that has been treated or modified in a way so as to render the surface highly resistant to adsorption of proteins onto the area protected. The protected surface may be interspersed with areas of surface that are not protected, i.e. a protected surface with selectively unprotected areas. In such a case, protein adsorption is dominantly restricted to the unprotected areas.

Accordingly, a "protective reagent" as described herein is an agent that, when applied to a surface in accordance with the present invention, renders a surface a protected surface. The unprotected areas may be functionalized with agent(s) that allow or facilitate adsorption and binding of specific proteins. As used herein the term "protein-binding reagent" refers to such agents. When used in combination, such as when a solution containing both is applied to a surface, the areas covered by protein-binding reagent will allow binding of specific proteins, and the areas covered by protective reagent will be resistant to binding. A desired protein binding density can therefore be achieved by choosing the appropriate proportions of protein-binding reagent and protective agent.

The term "self-assembled," when used herein to describe a layer of atoms, molecules, macromolecules, or similar structures applied to a surface, refers to the layer being generated by chemical and physical interactions between the constituent structures, where said interactions are a function of the properties of the structures and of the surface. In particular, self-assembled monolayers are layers that are one molecule deep and are created by simply applying a plurality of the molecules to a surface, rather than being created by depositing molecules one by one.

As used herein, the term "non-specific protein binding" refers to binding of proteins to a surface, where the ability to do so is not highly dependent on the identity of the protein. More particularly, in a location where binding of a specific class of proteins is expected, desired, or specifically designed for, binding outside that location or by proteins outside of that class may be considered to be non-specific.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

In the present disclosure, the term "preferably" or "preferred" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Embodiments of the Invention

A method of preventing non-specific adsorption of proteins onto a surface can include providing a substrate that has a surface on which surface groups are attached. A solution can be applied to the surface where the solution includes a protective reagent having a terminal functional group exhibiting a dipole moment. A monolayer including the protective reagent can be assembled on the surface by reacting the protective reagent with the surface groups, thereby creating a protected surface. The protective reagent alone is sufficient to confer to the protected surface an increased resistance to adsorption of proteins.

The substrate utilized can be any suitable material which can support a monolayer and which is or can be functionalized to include surface groups. Suitable surface groups allow reaction with the protective reagent and/or protein-binding reagent. Although a wide variety of materials can be suitable, non-limiting examples of substrate materials can include glass, quartz, silicon, polymers such as PDMS, metals such as gold, silver, copper, and the like, minerals, and combinations or composites of these materials. In one specific embodiment, glass can be used as the substrate. In this case, the surface groups are hydroxyl groups. Depending on the corresponding protective and/or protein-binding reagents suitable reactive surface groups can include metal oxides, polymer side chains, bare metal surfaces, and combinations thereof. Other substrates can be functionalized to provide suitable surface groups using known techniques such as, but not limited to, chemical functionalization, plasma functionalization, grafting, etching, bonding with native oxide layers, metal vapor deposition, or the like.

The protective reagent itself may be an organosilane or, more particularly, an alkoxysilane. Other classes of reagents would be suitable including halosilanes (chlorosilanes), epoxy silanes, silyl hydrides, alkyl thiols, and alkyl disulfides. Suitable molecules can have a surface-reactive group and a dipole terminal group. The surface-reactive group could be polymerizable to add stability to the protective reagent layer. The terminal functional group of the protective reagent may be a nitrile group, or in a specific embodiment, a cyano group, although other groups can also be suitable including alcohol, ethylene oxide, polyethylene oxide, carboxylic acid, phospholipid, ketone, and aldehyde, and nitro groups. In a particular embodiment, the dipole moment of the terminal functional group is from about 2 to about 10 Debye. In a specific embodiment, the protective reagent is (2-cyano-ethyl)triethoxysilane. Other suitable protective agents can be prepared from combinations of the surface-reactive groups and dipole-terminal groups listed above.

The method of the present invention confers resistance to nonspecific protein adsorption, so that a protein applied to the protected surface binds to less than about $1 \times 10^{-6}$ of the total area of the protected surface. In order to achieve at least some selective binding of specific proteins, a suitable protein-binding reagent can be included with the protective reagent which is then incorporated into the monolayer. The protein-binding reagent can be present over a range of composition in the protective reagent from as little as $1:10^9$ to as great as 50%. In a specific embodiment, the protective reagent can be used as a dilution carrier for a protein-binding reagent. By selectively adjusting the relative concentrations of protective reagent and protein-binding reagent the degree of protein-binding can be controlled. More specifically, a solution of the protective reagent and protein-binding reagent can be formed and then reacted with the surface groups to form the monolayer. In a more specific embodiment, the protective reagent and the protein-binding reagent are present in the solution at a ratio of from about $1.5 \times 10^7:1$ to about $6.0 \times 10^7:1$. Although not required, each of the protective reagent and the protein-binding reagent can be of the same class of compounds or same core compound with differing terminal groups. In a particular aspect of the invention, the protein-binding reagent is a silane. In a still more particular aspect, the protein-binding reagent is an amine-terminated silane. In another aspect, the protein-binding reagent is an alkoxysilane. In a specific embodiment, the protein-binding reagent is (3-aminopropyl)triethoxysilane. Suitable protein-binding groups can be linked to suitable surface-reactive groups including halosilanes (chlorosilanes), epoxy silanes, silyl hydrides, alkyl thiols, and alkyl disulfides. Other suitable protein-binding groups include thiol, succinimidyl ester, maleimide, histidine, and combinations thereof.

Once the highly selective and low density protein-binding surface is formed, various devices and or methods can be used to take advantage as previously discussed. In one example, the present invention provides a microanalysis platform. Such a microanalysis platform can include a substrate having a surface to which surface groups are attached and a monolayer comprising a protective group covering an area of the surface, so that the area covered is a protected surface. The protective group is bound to the surface groups and the protective group also has a terminal functional group exhibiting a dipole moment sufficient to substantially prevent or reduce protein-binding thereto. The protective reagent alone is sufficient to confer to the protected surface an increased resistance to adsorption of proteins. The microanalysis platform of the present invention resists nonspecific protein adsorption. In a particular embodiment, the microanalysis platform further comprises a protein-binding reagent as previously outlined. Although specific binding densities can be varied by adjusting relative concentrations of protein-binding reagent and protective reagent, the protective reagent and the protein-binding reagent can be present at a ratio of from about $1 \times 10^9:1$ to about 2:1. In another specific embodiment, the protein-binding reagent constitutes a less than $1 \times 10^{-6}$ fraction of the monolayer.

EXAMPLE

The following example represents one illustration of application and characterization of an embodiment of the present invention. Variations, including different materials and specific methodology, can be made without departing from the scope of the present invention while still falling within the appended claims.

Controlling Binding Density

The approach taken in accordance with the present invention to immobilize ligands or binding sites at very low densities on a surface is to incorporate reactive sites at low concentrations within a cross-linked monolayer self-assembled onto glass. Self-assembled silane monolayers have wide application in materials science, separations, and analysis, due to their versatility in modifying surfaces to produce stable and uniform films with a variety of interfacial properties. From the earliest studies of self-assembled organosilane monolayers, there has been a need for the production of mixed monolayers to control wetting and adsorption behavior.

An object of the present invention is to use mixed silanes to generate binding sites with very wide spacing on the surface. The general idea is to incorporate a target silane reagent, having a reactive group to provide a binding site for a ligand, at very low concentrations into the self-assembled and cross-linked film, composed primarily of an inert silane that is compatible with the solution interface and reactions of the immobilized ligand. Specifically, very dilute amine sites can be incorporated into a nitrile-terminated alkylsilane, where the dipolar character of the nitrile group is compatible with aqueous solution but otherwise inert to reactions with the amine binding sites or immobilized ligands.

In one embodiment of the present invention, mixed silane monolayers are self-assembled onto glass from solutions containing very low concentrations of (3-aminopropyl)triethoxysilane (APTES) and much higher concentrations of (2-cyanoethyl)triethoxysilane (CETES). Alkoxysilane reagents may be used for this invention because they are compatible with a terminal amine group and are less susceptible than chlorosilanes to polymerization due to traces of water in solution. The densities of aminesilane groups may be characterized using epifluorescence imaging of individual dye molecules covalently attached to the surface amine groups. The surfaces can be also characterized by bright-field plasmon-resonance imaging of streptavidin-conjugated 10-nm gold colloids bound to biotin molecules immobilized on the amine binding sites. The density of the immobilized biotin molecules can also be assessed using total internal reflection fluorescence (TIRF) imaging of fluorescently labeled neutravidin. All three of these methods give consistent amine coverage results and indicate that quantitative control of binding site densities can be achieved at very low ($<10^{-7}$) fractions of a full monolayer.

Chemicals and Materials

Spectrophotometric-grade solvents, toluene, methanol, n-heptane, and N,N-dimethylformamide (DMF), were obtained from Fisher Scientific (Hampton, N.H.). Toluene and n-heptane were dried over sodium for 24 h and filtered through a Millipore (VWR, West Chester, Pa.) PTFE 0.2-μm filter prior to use; methanol and DMF were used as received. Both 5-(and 6)-carboxytetramethylrhodamine succinimidyl ester (TMR-SE) and 6-(6-((biotinoyl)bis(aminohexanoyl)) succinimidyl ester (biotin-xx-SE) were purchased from Biotium inc. (Hayward, Calif.) and were used as received. Tetramethylrhodamine-labeled neutravidin and 5-(and-6)-carboxy-Alexafluor-514 succinimidyl ester (Alexa-SE) were purchased from Molecular Probes (Eugene Oreg.). CETES and APTES were acquired from Gelest (Morrisville, Pa.). Streptavidin-conjugated gold colloid particles having a mean diameter of 9.7 nm, a particle density of $1.7 \times 10^{13}$ particles $mL^{-1}$, and an average of 20 streptavidin/gold colloid were acquired from Ted Pella (Redding, Calif.). Coverslips (No. 1, 22×22 mm) were purchased from VWR (West Chester, Pa.).

Surface Derivatization

Surface preparation began with cleaning of the glass coverslips to remove contamination. Cleaning of coverslip surfaces was accomplished by rinsing the slides with methanol, allowing them to dry, and then placing them in a UV-ozone cleaner (Jelight Co. model 342) for 25 min on each side. Slides were checked using water contact-angle measurements to determine cleanliness; a contact angle of <5° indicated that slides were sufficiently clean to produce uniform silane monolayers with minimal fluorescence background.

Fresh stock solutions of 1 M CETES and 1 nM APTES were prepared in dry toluene; small aliquots of these solutions were diluted into dry n-heptane producing reaction solutions consisting of 2 mM CETES and the desired concentration (0.04-0.105 nM) of APTES. Cleaned coverslips were placed in the reagent solutions and allowed to react for a period of 2 h, after which, they were rinsed 4 times each with toluene and methanol. Surface-modified coverslips were annealed in a 120° C. oven for 30 min to promote reaction with the surface and cross-linking of the silanes as illustrated in FIG. 1. Coverslips were then stored under methanol for up to one week until used.

Reaction with amine reactive sites was accomplished through the use of succinimidyl ester binding chemistry, where the labeling reagent will react with surface amines to form a peptide bond to the surface. Succinimidyl ester binding in phosphate buffer (pH 9.3) to a primary amine linker for a cyanine dye has been shown to be complete, 87% isolated yield. The succinimidyl ester reagent is susceptible to rapid hydrolysis in aqueous solution, with a half-life of 10 min at pH 8.6 and 4° C. To produce higher yields for a binding reaction, one can avoid hydrolysis of the succinimidyl ester reagent by carrying out the reaction in an organic solvent such as DMF or DMSO, allowing the effective reaction time to be increased. Based on this strategy, a stock solution of 3 mg of TMR-SE in 5 mL of DMF was prepared and kept at −20° C. until use. An aliquot of the TMR-SE stock solution was diluted 1:125 in DMF (7.5 μM), and the amine-modified surfaces were reacted in this solution for 1 h and then rinsed twice in DMF and four times in methanol for 20 min each. The derivatized coverslips were stored in methanol in the dark prior to their examination by fluorescence microscopy. Reaction of amine-modified slides with Alexa-SE was carried out under identical conditions.

Surface-amine sites were also tagged with a biotin label in order to test the binding site density using streptavidin-conjugated gold colloid and fluorescently labeled neutravidin. A succinimidyl ester reaction with the surface-amine groups was again employed, in this case using biotin-xx-SE at 7.5-μM in DMF reacted for 1 h, followed by rinsing twice in DMF and four times in methanol for 20 min each. Once excess biotin-xx reagent was removed, the biotinylated coverslips could be reacted with streptavidin-conjugated gold particles or fluorescently labeled neutravidin. For the gold labeling of the biotin sites, slides were submerged in a glass petri dish containing streptavidin-conjugated gold colloids at a concentration of $2.1 \times 10^{11}$ particles/mL, suspended in 20 mM phosphate buffer saline (pH 7.5, ionic strength of 100 mM with sodium chloride). Coverslips were allowed to react for a period of 24 h, rinsed with buffer and methanol, and allowed to dry prior to imaging. For fluorescence labeling of the biotin sites, biotinylated coverslips were introduced into a microscopy flow cell and illuminated with 528.7-nm laser radiation on the TIRF microscope for 20 min, to photobleach any fluorescence spots from the glass substrate. The substrate was then reacted with a 6.7 pM TMR-labeled neutravidin in 20 mM phosphate buffer saline for 50 min in the flow cell, after which the surface was rinsed with multiple flow-cell volumes of phosphate buffer and immediately imaged using TIRF microscopy.

Microscopy Measurements

Fluorescence imaging of surface-immobilized tetramethylrhodamine and Alexa-514 dye molecules was performed using epifluorescence microscopy. Imaging was done with a fluorescence microscope to which several modifications and improvements were made. Briefly, the 514.5-nm line from an argon ion laser (Spectra-Physics) was used as the excitation source and was passed through a Pellin-Broca prism and an aperture to remove plasma lines. The beam was shuttered by an acousto-optic deflector (AOM, Crystal Technology) to control sample illumination. The switched beam was passed through a quarter wave plate to transform the linearly polarized light into circular polarized light, so that excitation of molecules that were attached to surfaces were independent of their orientation. The beam was then passed on a roughened glass disk to create an incoherent spot source for excitation; the disk was rotated at several hundred rotations per minute in order to average out the speckle pattern on the time scale of the experiment. The spot on the glass disk was then reimaged with a 55-mm focal length, f/1.2 camera lens (Canon) into the back of the microscope (Nikon). The beam was then passed through a Chroma 514.5-nm band-pass filter (10-nm bandwidth), reflected off of a 545-nm dichroic beam splitter and directed into a Nikon plan fluor 100×, 1.3 NA, oil immersion objective. The beam overfilled the collection cone of the objective, creating a nearly uniform intensity profile over the observation area; the laser power coupled into the objective ~17 mW. Fluorescence emission was collected back through the same objective, transmitted by the 545-nm dichroic beam splitter, through a 530-nm long-pass filter and imaged on a Photometrics CoolSNAP$_{HQ}$ 12-bit CCD camera with a low-bandwidth sensitivity of 3.4 photoelectrons/bit. MetaMorph (Universal Imaging) software was used to control the camera, collect images (1-s integration times), and analyze the image data. The length scales for all microscopy experiments were calibrated with a USA-1951 standard resolution test target (Newport).

Imaging of surface-attached, streptavidin-conjugated gold colloid particles was accomplished using an Olympus IX71 inverted microscope. The samples were imaged in bright field using a 0.30 NA overhead illuminator; light transmitted by the sample was collected through an Olympus plan apo 60×, 1.45 NA, oil immersion objective, passed through a dichroic beam splitter and bandpass emission filter (Chroma Z514RDC and HQ560/50, respectively), and imaged on a Photometrics CoolSNAP$_{HQ}$ CCD camera. MetaMorph Imaging software was again used to collect and analyze the brightfield images acquired in 10-ms integrations. Surface-bound neutravidin were also imaged using the same Olympus inverted microscope, operated in TIRF mode. Excitation of the sample was achieved using an argon ion laser (Coherent, model Innova 300) operated at 528.7 nm and coupled into the microscope using a single-mode optical fiber. Total internal reflection was achieved by translating the fiber vertically, which in turn moved the position of the incoming laser beam (25 mW) to the edge of the objective until internal reflection was observed at the interface between the coverslip surface and the buffer solution. TIRF images were acquired with 200-ms integration times.

Single-Molecule Fluorescence Counting of Surface Binding Sites

Reactive amine functional groups were immobilized at very low surface densities on glass by self-assembly of mixed silane monolayers from solutions containing very low concentrations of APTES and much higher concentrations of CETES. In the surface derivatization chemistry of this embodiment, self-assembly from dry n-heptane solution promotes adsorption from solution of the reactants onto the glass surface. The surfaces were rinsed in toluene and methanol to eliminate excess silane reagent, following which they were heated to 120° C. for 30 min to promote condensation reactions with the surface and cross-linking of monolayer film. The concentrations of APTES (0.04-0.105 nM) to CETES (2 mM) corresponded to a concentration ratio of $2\times10^{-8}$–$5.25\times10^{-8}$. If the amine-bindng site concentrations in the monolayer corresponded directly to these dilution factors, then one would expect the amine sites to be spaced between 2.1 and 3.4 μm based on molecular density of self-assembled and cross-linked alkylsiloxane monolayers of ~0.23 (±0.02) nm$^2$/silane determined by infrared absorption and X-ray reflection measurements. The expected distances between highly diluted amine binding sites, therefore, could be easily resolved within the diffraction limits of optical microscopy.

Figure 2A:
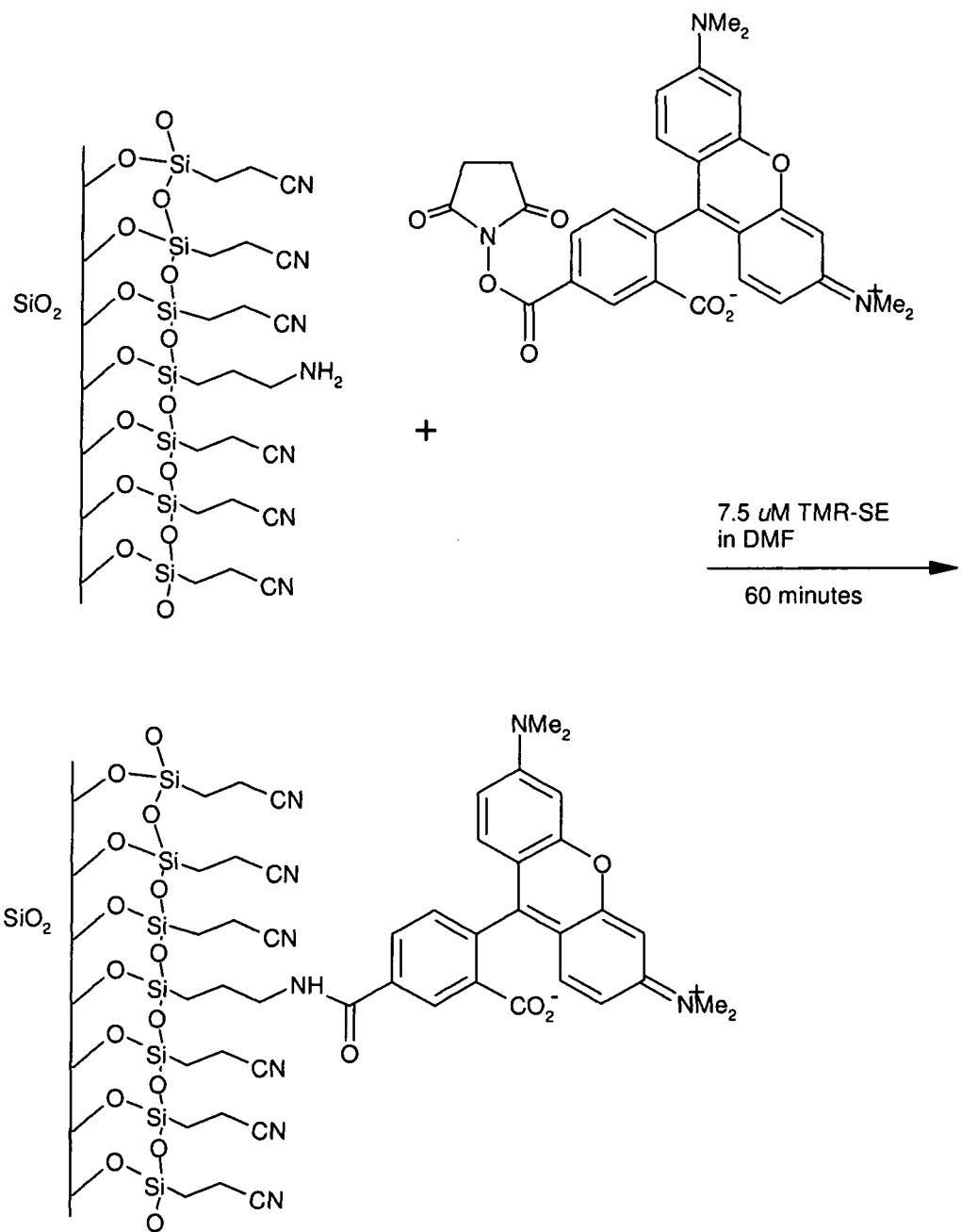
FIGS. 2A and 2B shows a reaction scheme for labeling of amine binding sites, where

To measure the surface density of aminopropylsilane molecules immobilized in the cyanoethylsilane monolayer, the amine groups were reacted with TMR-SE in DMF for 60 min according to the reaction scheme shown in FIG. 2A. The reacted slides were rinsed in DMF and methanol and then imaged by epifluorescence microscopy, which was previously shown to yield reliable (>96%) detection of rhodamine 6G molecules adsorbed to glass surfaces. The threshold for counting single-molecule spots was determined from the background intensity and noise level for a sample where no TMR molecules were immobilized, which produced an equivalent background as regions between bright spots on TMR-labeled surfaces. This background level was $\mu_B$18 17 photoelectrons, while the pixel-to-pixel variation in background counts had a standard deviation, $\sigma_B$=12 photoelectrons, which is 3 times greater than the photoelectron shot noise. The threshold for counting molecules was set conservatively at Lc=85 photoelectrons, which is 5.7 times $\sigma_B$ above $\mu_B$, making the probability of false positive counts arising from the variation in the dark background negligible, $<10^{-8}$. The fluorescent spots had an average diameter (fwhm) of 320 nm, which is equivalent to the diffraction limit of the 1.3-NA objective at the average wavelength of TMR fluorescence emission of 560 nm, where the diffraction-limited Gaussian spot should exhibit a fwhm=0.72 λ/NA=310 nm. The spots exhibited a distribution of intensities above the background with an average peak intensity $\mu_P$=414 photoelectron counts and a standard deviation that was ~3 times larger than the photoelectron shot noise, $\sigma_P$=67, probably due to differences in molecular orientation, local environment of the surface, or photobleaching. The intensity threshold for counting molecules, Lc=85 photoelectrons, is 4.9$\sigma_P$ below the average peak intensity, so the probability of missing a TMR molecule on the surface is small, $<10^{-6}$.

Setting the threshold, Lc, at 85 photoelectrons, one can plot the positions of the fluorescence spots on the surface that exceed this level. The locations of the molecular spots appear at first glance to exhibit patterns of molecules bound in curved lines with large open areas between them. While one might be tempted to attribute these "patterns" to inhomogeneities in the binding of amine-terminated silanes in the self-assembled monolayer, they are actually characteristic of a random distribution in two dimensions. Other examples of 2-D random distributions show very similar patterns, where a random distribution clearly does not lead to a uniform spacing of bound molecules.

To determine the surface concentration of amine-bound tetramethylrhodamine molecules on the surface, the number of spots above threshold were counted in five different areas on three separate coverslips for each amine concentration. This operation was carried out for four concentrations of aminopropylsilane in the cyanoethylsilane monolayer, including "blank" where no APTES was present in the self-assembly step. The blank slides generated an average background spot density of 0.033 (±0.006) spots/μm$^2$, apparently due to luminescent impurity sites in the glass; coverslips fresh from the UVO cleaning exhibit the same background spot density without a CETES monolayer or exposure to TMR-SE. In addition to the tetramethylrhodamine labeling of amine sites, these sites were also labeled with 5-(and 6)-carboxy-Alexafluor-514 succinimidyl ester. This probe carries a double negative charge from two sulfonate groups so that it is more water soluble and less prone to nonspecific adsorption to glass than tetramethylrhodamine. The Alexa-514 label produces somewhat weaker fluorescence than tetramethylrhodamine in single-molecule imaging experiments ($\mu_P$=170 photoelectrons), and therefore a lower threshold (Lc=41 photoelectrons) was used to read out the single-molecule spots. The lower threshold increased the probability of false positive counts from the background; Lc is 2.9 times $\sigma_B$ above $\mu_B$ in this case, making the probability of false positive counts ~$2\times10^{-3}$/pixel. To reduce the potential impact of false positives on the spot count, an additional criterion was applied, where at least three connected pixels must be above the threshold for the spot to be counted; this criterion lowers the false positive probability from background fluctuations to a negligible level. Alexa-514 labeling results at two concentrations of APTES closely match the molecular spot counts determined from tetramethylrhodamine labeling. Both results show a consistent, linear dependence of the surface density of labeled amine sites on the concentration of APTES in the self-assembled monolayer.

Biotin-Avidin Labeling of Amine Binding Sites

Figure 2B:
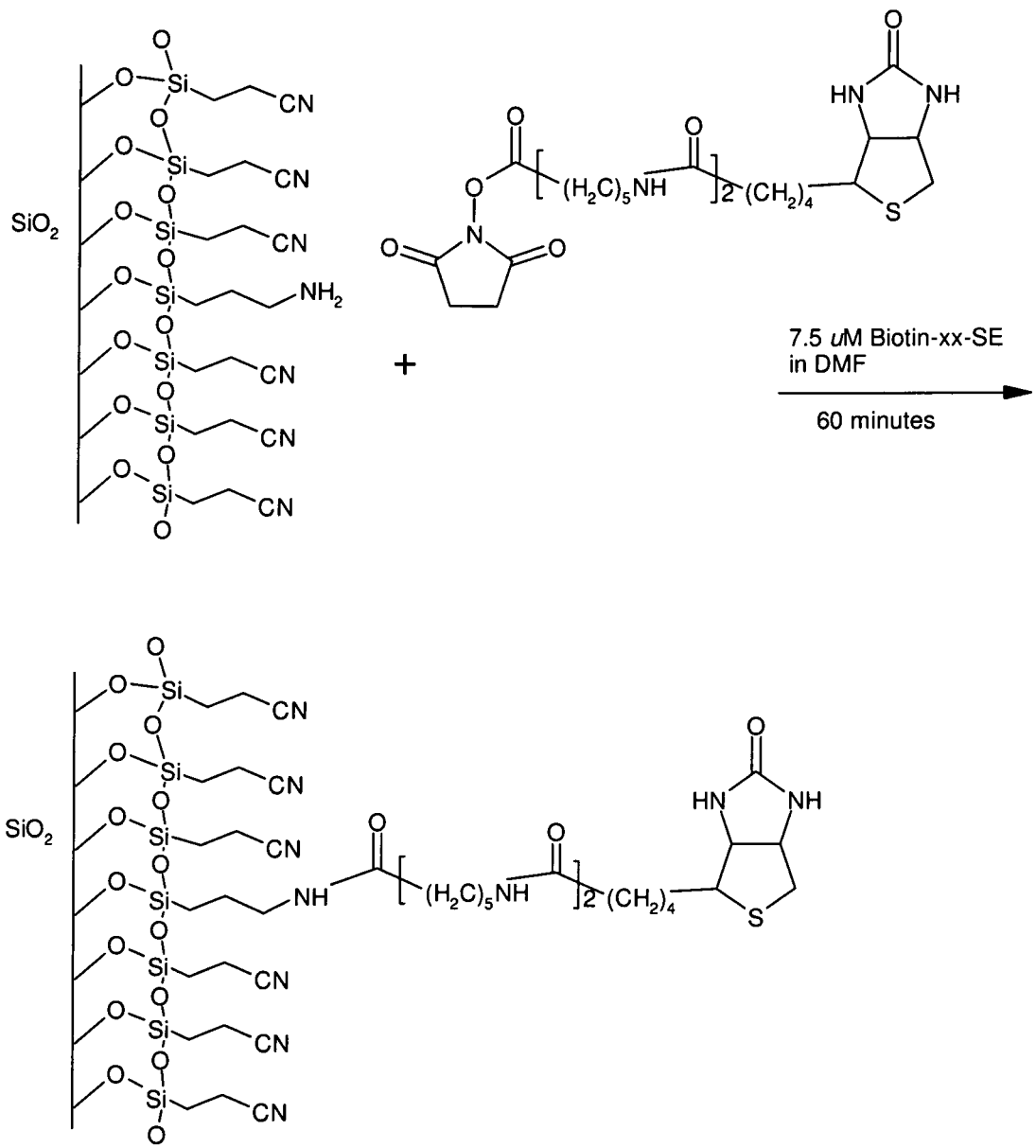
Figure 3:
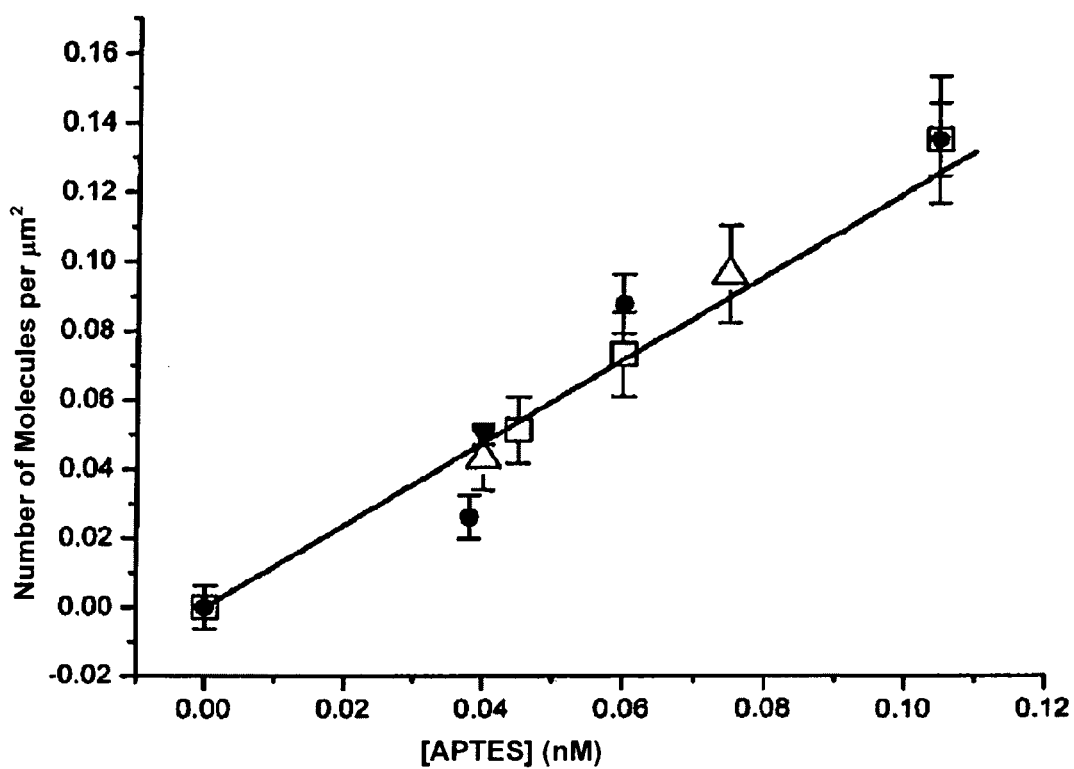
FIG. 3 shows a plot of amine binding site density versus different concentrations of (3-aminopropyl)triethoxysilane diluted in (2-cyano-ethyl)triethoxysilane in accordance with one embodiment of the present invention.

While the single-molecule labeling of amines with two different fluorescent probes gave consistent spot densities that varied linearly with the APTES concentration, the single-molecule fluorescence measurement is also sensitive to the population of background spots from the glass substrate, the number of which is comparable to the amine site densities produced at the lowest concentrations of APTES. It is important to confirm the reactive amine site density by a technique that is insensitive to luminescent impurity spots. To that end, the surface site density was characterized in a series of APTES concentration-dependent experiments, where biotin was immobilized to the amine sites and then biotin-streptavidin binding was used to capture streptavidin-conjugated gold particles to the surface site. Surface amine sites were tagged with biotin using a condensation reaction to immobilize biotin-xx-SE to the aminopropylsilane sites on the surface as illustrated in FIG. 2B. The excess biotin-xx-SE reagent was removed, and the biotinylated coverslips were reacted with streptavidin-conjugated gold (10-nm diameter) and imaged under bright-field illumination; this gold-colloid labeling and imaging approach has been used previously to observe and track the motions of single protein molecules in cells and membranes.

To increase the contrast for detecting the absorption and scattering by the gold particles, a bandpass filter restricts the wavelength of the transmitted radiation to 530-580 nm. This range overlaps with the plasmon resonance extinction of the streptavidin-conjugated gold particles, which peaks at ~535 nm and drops to only half intensity by 580 nm. The diameter of these dark spots is larger than the diffraction-limited size of single molecules imaged in fluorescence; the poorer spatial resolution is not due to the gold particles being "out of focus" but is rather due to the limited numerical aperture (0.3 NA) of the bright-field illuminator. The predicted diffraction-limited diameter for 0.3 NA illumination is ~1.3 μm, which is slightly larger than the size of the Airy disk pattern produced in the bright-field image, probably due to particle scattering at higher angles than the incident radiation. These spots exhibit a readily detected change in intensity, relative to the bright background, and provide a reliable area to threshold and count the gold particles bound to the glass surface. The threshold for counting the gold particle spots was determined from the average level, $\mu_B$=230 photoelectrons, and variation, $\sigma_B$=18 photoelectrons, of the bright background. The threshold for counting a negative-going spot was set at Lc=165, 65 photoelectrons or 3.6 times $\sigma_B$ below the bright background, so that the probability of false positive results is small, $\sim 2 \times 10^{-3}$; to reduce the likelihood of false positives, again an additional criterion was applied where at least three connected pixels must be below the threshold for the spot to be counted. The intensity at the center of the dark spots decreases to 118 photoelectrons on average with a standard deviation of ~14 photoelectrons, so that Lc=165 is 3-4 standard deviations above the average dark spot, making the probability of missing a spot $\sim 3 \times 10^{-3}$.

Application of this threshold to the data produces a plot of the locations of the gold particles on the slide that shows a similar random pattern of spots as observed with single-molecule fluorescence imaging. The spot densities based on counting streptavidin-labeled gold particles are included with the single-molecule fluorescence counting results in FIG. 1.

In this case, no background spot count was subtracted from the measured spot densities, based on a control experiment where a cyanoethylsilane surface was prepared without amine-binding sites and allowed to react with streptavidin-conjugated gold colloid. After rinsing, this surface exhibited no detectable spots below the bright-field background threshold. The measured spot densities from streptavidin-labeled gold particles closely follow the single-molecule fluorescence results and confirm the reactive amine site densities by a technique that is insensitive to luminescent impurity spots.

Several possible explanations could be offered for a smaller relative concentration of labeled sites on the surface compared to the ratio of silane reagents in solution. First, there could be molecules missed in the counting of labeled sites due to overlap between single-molecule fluorescence or single-particle extinction spots. With a diffraction-limited spot size of 320 nm for single-molecule fluorescent spots and a maximum spot density of 0.14 $\mu m^{-2}$, the probability of spot overlap is less than 1.4% based on a Poisson statistical model, so that an apparent 50% discrepancy is not due to this phenomenon. There is a possibility that the succinimidyl ester reaction that binds labels to the amine sites was incomplete. This reaction is reported to be complete (87% isolated product yield) even under conditions less favorable than those employed in this study. Furthermore, the yield was consistent among the binding of three different succinimidyl ester probes to the surface. We are left with the conclusion that the densities of surface amine groups reported by these experiments are correct, and that the cyano-terminated silane exhibits preferential self-assembly to the glass surface. A higher concentration of bound cyano groups would be expected if the free energy of the self-assembled monolayer were raised slightly by substituting an amine-terminated silane for a cyano-terminated silane. This free energy cost could derive from the disruption of strong dipole-dipole head-to-tail interactions between adjacent C/N groups on the surface, which would dominate the monolayer structure at the high surface coverage of cyanoethylsilane.

An important application of chemically modified surfaces with controlled and widely spaced binding sites would be for immobilizing and studying individual biological molecules. The possibility of using these surfaces for such applications was tested using biotin-avidin binding, which is commonly employed to immobilize antibodies, enzymes, liposomes, and even biological cells to surfaces. Neutravidin (a deglycosylated form of avidin) was chosen for this study because it exhibits lower nonspecific adsorption to surfaces than avidin, while retaining a high affinity for biotin. Biotinylated coverslips were prepared by immobilizing biotin-xx-SE to aminopropylsilane sites on the glass surface, as above. The biotinylated coverslips were assembled into the microscopy flow cell and then illuminated with 528.7-nm laser radiation on the TIRF microscope for 20 min to photobleach any fluorescence spots from the glass substrate. The biotinylated coverslips were then exposed to a 6.7 pM solution of TMR-labeled neutravidin in phosphate buffer in a microscopy flow cell for 50 min, after which the surface was rinsed with multiple flow-cell volumes of buffer and imaged immediately using TIRF microscopy.

Multiple fluorescent labels per probe molecule (~2.3/neutravidin) lead to brighter spots, but also increase the relative spot-to-spot variation in the peak intensity ($\sigma_P$=102 photoelectrons) due to differences in the number of labels per probe molecule. A threshold for counting bound molecules was determined using data from a blank slide, which produced a background, $\mu_B$=16 photoelectrons with standard deviation, $\sigma_B$=10 photoelectrons, comparable to the values observed on the epifluorescence microscope. The threshold, Lc, was set at 85 photoelectrons or 7 times $\sigma_B$ above the background, which leads to a negligible probability of false positives from the fluctuations in the dark background. Because of the pre-exposure of the substrate to laser radiation and photobleaching of impurity spots in the glass, a zero background from the substrate was indeed achieved in this case; after the photobleaching step and prior to exposure to labeled neutravidin, the substrates exhibited no detectable spots.

False positives could also arise from nonspecific binding of neutravidin to the cyanoethylsilane surface; this possibility was tested by allowing the labeled neutravidin to interact with a CETES-derivatized surface with no immobilized biotin. This surface was allowed to interact with neutravidin under identical conditions and was rinsed with buffer prior to imaging. This experiment produced no spots above threshold, indicating that nonspecific adsorption of neutravidin to the CETES-derivatized surface yields no false positive counts. The surface density of bound neutravidin was determined from this experiment for two different slides prepared with 0.04 nM APTES in the original self-assembled monolayer synthesis yielded an average of 0.050 ($\pm$0.003) biotin molecules/$\mu m^2$. This point is included in the plot of the site density versus APTES concentration (FIG. 1) and agrees well with predicted site densities.

One aspect of this invention is to control the binding site density of reactive ligands on surfaces by diluting surface amine groups in self-assembled and cross-linked monolayers composed principally (>99.99999%) of cyanoethylsilane on glass. The cyanoethylsilane surface is strongly dipolar, compatible with aqueous solution, and it shows little nonspecific binding of a water-soluble protein (neutravidin) from aqueous solutions. Furthermore, surface modification with cyanoethylsilanes does not rely on the adsorption of secondary proteins or the use of polymers to block non-specific adsorption sites. Blocking proteins and polymers can block or cover up specific binding sites that have been immobilized to the glass substrate. The combination of dipolarity without hydrogen bonding interactions of the terminal cyano-group seems to be uniquely suited to avoiding protein adsorption to these surfaces.

The treated surfaces are likely most repellant for water-soluble, plasma proteins. The surface is less repellant to membrane-bound proteins, as discussed above. Further testing of the range of protein structures that would be repelled from a cyano-terminated surface would be useful. The long-term stability of protein repellency would depend on the rate of hydrolysis of the siloxane bonds used to bind and cross link the coating to the surface. This chemistry is used produce chromatographic stationary phases, which are stable in aqueous solutions a near neutral pH for periods as long as a year. Using longer alkyl chains to support the terminal cyano group may reduce the exposure of the siloxane region of the molecule to water and make the coating even more stable.

The extreme dilution of amine binding sites allows them to be spaced over micrometer distances that can be resolved by optical microscopy. The surface amine sites are suitable for attaching labels and ligands by reaction with succinimidyl ester reagents. Labeling the amine sites with fluorescent molecules and imaging the surface provided a means of determining the density of amine sites on the surface and their dependence on the concentration of the amine reagent (APTES) in the original self-assembled monolayer synthesis. Amine sites were incorporated into the self-assembled monolayer in proportion to the concentration of APTES in the synthesis, but the mole ratio of aminopropylsilane to cyanoethylsilane in the monolayer was about half the ratio in the synthesis, indicating that the cyanoethylsilane forms a more stable monolayer, perhaps through head-to-tail dipole-dipole interactions between adjacent nitrile groups.

Using single-molecule counting to determine the surface density of amine sites on the surface suffers from a background of luminescent spots from the glass substrate. Two different methods were employed to confirm the number of amine sites independent of the substrate background. Both approaches involved the binding of biotin to the surface amine sites using 6-(6-((biotinoyl)bis(aminohexanoyl))succinimidyl ester. The immobilized biotin was then labeled with streptavidin-conjugated gold colloid particles, followed by imaging of the plasmon resonance absorption with bright-field illumination. A second approach to counting immobilized biotin molecules was to react them in a microscopy flow cell with fluorescently labeled neutravidin and image them with TIRF microscopy, where the background of the substrate could be photobleached with laser excitation prior to the labeling step. Both of these approaches produced no detectable background spots, and furthermore, the quantitative spot densities agreed with the single-molecule counting results corrected for substrate background. The results of all three imaging methods give consistent amine and biotin site coverages, indicating that quantitative control of binding site densities and their chemical transformation can be achieved at very low (<$10^{-7}$) fractions of a full monolayer. Applications of these substrates for investigating single-molecule binding equilibria and reaction kinetics at individual ligand sites on surfaces can be envisioned.

As partially discussed above, to examine the protein repellency of the modified surfaces two proteins were tested, tetramethylrhodamine-labeled neutravidin and tetramethylrhodamine-labeled alpha-hemolysin. The surface density of non-specifically adsorbed protein was determined using total internal reflection fluorescence microscopy and single-molecule counting. The technique is capable of quantifying non-specific adsorption at an extremely low level, corresponding to surface-coverages less than $10^{-9}$ of a monolayer.

It was found that neutravidin (from a 13 pM solution) exhibits non-specific adsorption to the cyano-modified surface below the $10^{-9}$ monolayer level, demonstrating the protein repellency of the cyano surface. Adsorption of labeled alpha-hemolysin (a membrane-active protein) was examined on a bare glass and cyano-modified surfaces. Using single-molecule counting, it was found that this membrane-active protein exhibited a ten-fold reduction in the non-specific adsorption to the cyano-modified surface as compared to bare glass.

Surface coatings in accordance with the present invention can be useful in the development of biosensors, which require selective binding of target proteins from a sample to immobilized ligands on a biosensor surface, with minimal non-specific interactions with the surface, which would give rise to a false-positive response. Due to the reduction in protein adsorption, these surfaces can also repel the growth of bacteria or cells, so that they provide a surface treatment for medical implant applications. The coating may also be useful in protein separation applications where strong non-specific adsorption can lead to poor separations.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method of preventing non-specific adsorption of proteins onto a surface, comprising
   (a) providing a substrate having a surface to which surface groups are attached;
   (b) applying to the surface a solution that includes a protein-binding reagent and a protective reagent having a terminal functional group exhibiting a dipole moment, wherein the protective reagent is a dilution carrier for the protein-binding reagent; and
   (c) assembling a monolayer by reacting the solution with the surface groups so as to create a protected surface comprising the protective reagent and the protein-binding reagent such that both are bonded to the substrate, wherein the protective reagent alone is sufficient to confer to the protected surface an increased resistance to adsorption of proteins.

2. The method of claim 1, wherein the terminal functional group is a nitrile group.

3. The method of claim 1, wherein the terminal functional group is a cyano group.

4. The method of claim 1, wherein the protective reagent is an organosilane.

5. The method of claim 4, wherein the protective reagent is an alkoxysilane.

6. The method of claim 5, wherein the protective reagent is (2-cyano-ethyl)triethoxysilane.

7. The method of claim 1, wherein the substrate is a member selected from the group consisting of glass, quartz, silicon, polymer, metal, mineral, and combinations or composites thereof.

8. The method of claim 7, wherein the substrate is glass.

9. The method of claim 1, wherein a protein applied to the protected surface binds to less than about $1\times10^{-6}$ of the total area of the protected surface.

10. The method of claim 1, wherein the dipole moment is from about 2 to about 10 Debyes.

11. The method of claim 1, wherein the protective reagent and the protein-binding reagent are present in the solution at a ratio of from about $1.5\times10^{7}:1$ to about $6.0\times10^{7}:1$.

12. The method of claim 1, wherein the protein-binding reagent is a silane.

13. The method of claim 12, wherein the protein-binding reagent is an amine-terminated silane.

14. The method of claim 12, wherein the protein-binding reagent is an alkoxysilane.

15. The method of claim 14, wherein the protein-binding reagent is (3-aminopropyl)triethoxysilane.

16. A microanalysis platform, comprising:
   (a) a substrate having a surface to which surface groups are attached; and
   (b) a monolayer comprising a protein-binding agent and a protective reagent covering an area of the surface so that the area covered by the protective reagent is a protected surface, where the protein-binding reagent is bound to the surface groups and the protective reagent is bound to the surface groups and the protective reagent has a terminal functional group exhibiting a dipole moment from about 2 to about 10 Debyes, wherein the protective reagent alone is sufficient to confer to the protected surface an increased resistance to adsorption of proteins, and wherein the protective reagent is a silane.

17. The microanalysis platform of claim 16, wherein the terminal functional group is a nitrile group.

18. The microanalysis platform of claim 17, wherein the terminal functional group is a cyano group.

19. The microanalysis platform of claim 16, wherein the protective reagent is an alkoxysilane.

20. The microanalysis platform of claim 19, wherein the protective reagent is (2-cyano-ethyl)triethoxysilane.

21. The microanalysis platform of claim 16, wherein the substrate is a member chosen from the group consisting of glass, quartz, silicon, polymer, mineral, metal, and combinations or composites thereof.

22. The microanalysis platform of claim 21, wherein the substrate is glass.

23. The microanalysis platform of claim 16, wherein the protective reagent and the protein-binding reagent are present at a ratio of from about $1.5\times10^{7}:1$ to about $6.0\times10^{7}:1$.

24. The microanalysis platform of claim 23, wherein the protein-binding reagent constitutes less than $1\times10^{-6}$ fraction of the monolayer.

25. The microanalysis platform of claim 16, wherein the monolayer is a self-assembled monolayer.

26. A microanalysis platform, comprising:
   (a) a substrate having a surface to which surface groups are attached; and
   (b) a monolayer comprising a protein-binding agent and a protective reagent covering an area of the surface so that the area covered by the protective reagent is a protected surface, where the protein-binding reagent is bound to the surface groups and the protective reagent is bound to the surface groups and the protective reagent has a terminal functional group exhibiting a dipole moment from about 2 to about 10 Debyes, wherein the protective reagent alone is sufficient to confer to the protected surface an increased resistance to adsorption of proteins, and wherein the monolayer is a self-assembled monolayer.

* * * * *